US005526336A

United States Patent [19]

Park et al.

[11] Patent Number: 5,526,336

[45] Date of Patent: Jun. 11, 1996

[54] OPTICAL PICKUP FOR OPTICAL DISK HAVING MULTIPLE RECORDING LAYERS

[75] Inventors: Tai-suk Park, Suwon-city; Chul-woo Lee; Kyung-hwa Rim, both of Seoul, all of Rep. of Korea

[73] Assignee: Samsung Electronics Co., Ltd., Kyungki-do, Rep. of Korea

[21] Appl. No.: 458,164

[22] Filed: Jun. 2, 1995

[30] Foreign Application Priority Data

Jan. 24, 1995 [KR] Rep. of Korea ........................ 95-1222

[51] Int. Cl.[6] ........................................................ G11B 7/09

[52] U.S. Cl. ............... 369/094; 369/44.230; 369/44.370; 369/110; 369/112

[58] Field of Search .............................. 369/44.37, 44.38, 369/110, 94, 100, 112, 109, 44.23, 44.24; 250/201.5

[56] References Cited

U.S. PATENT DOCUMENTS 4,908,813 3/1990 Ojima et al. .......................... 369/94 X
5,097,464 3/1992 Nishiuchi et al. ...................... 369/112
5,408,453 4/1995 Hottslag et al. ................. 369/44.38 X
5,446,565 8/1995 Komma et al. .................. 369/44.23 X

*Primary Examiner*—Aristotelis Psitos
*Assistant Examiner*—Thang V. Tran
*Attorney, Agent, or Firm*—Leydig, Voit & Mayer

[57] ABSTRACT

An optical pickup for all optical disk having multiple recording layers is provided to exactly control a focal position according to the thickness of optical disk, by separately controlling focal positions on each recording layer, wherein a Fresnel lens for diffracting an optical beam generated from an optical source and an objective lens for focusing the diffracted beam are separately located, and focus driving coils are included for separately driving the Fresnel lens and objective lens by using a signal detected by an optical detector. As the interval between the Fresnel lens and objective lens is varied, the interval between focal points formed on each recording layer is also varied. Thus, the focal positions formed on each recording layer can be exactly controlled according to the thickness of optical disk. Therefore, information can be clearly reproduced without interference by simultaneously scanning each recording layer while exactly controlling the focal positions.

6 Claims, 7 Drawing Sheets

OPTICAL PICKUP FOR OPTICAL DISK HAVING MULTIPLE RECORDING LAYERS

BACKGROUND OF THE INVENTION

The present invention relates to an optical pickup for an optical disk having multiple recording layers, and more particularly to, an optical pickup for an optical disk having multiple recording layers which are simultaneously scanned for recording or reading out information on or from the multiple recording layers of optical disk.

The optical disk is widely known as an optical recording medium, which has multi-optical layers in which two or more recording layers on which information is recorded are overlapped. Also, an optical pickup from which the recorded information is read out by simultaneously scanning the multiple recording layers thereof is well known, as compared with the optical disk having such multiple recording layers.

FIG. 1 shows a conventional optical pickup having dual recording layers. An optical beam generated from an optical source 1 is collimated by a collimating lens 2. The collimated beam is reflected by a beam splitter 3 and transmitted to a Fresnel lens 4 as a diffraction element. Then, the transmitted light is incident to an objective lens 5. Thus, a plurality of beams diffracted by Fresnel lens 4 are incident to objective lens 5, so that beam spots are respectively formed on recording layers 7 and 8 of optical disk 6.

The beam reflected from recording layers 7 and 8 of optical disk 6 passes through beam splitter 3 via objective lens 5 and Fresnel lens 4. The reflected beam having passed through beam splitter 3 is detected as an electrical signal by an optical detector 11 via a condensing lens 9 and a sensor lens 10.

In the conventional optical pickup as described above, Fresnel lens 4 and objective lens 5 are jointly set in a body tube 12. Focus driving coils 13 are attached to both sides of body tube 12 and permanent magnets 14 for generating magnetic flux are arranged on the exterior of body tube 12 near focus driving coil 13. Focus driving coils 13 vertically moves together with body tube 12 by the focus error signal extracted from the signal detected by optical detector 11. That is, objective lens 5 is driven together with Fresnel lens 4 so as to compensate a focusing error of objective lens 5 with respect to optical disk 6, which is caused due to the vertical vibration of the optical disk.

In this structure where Fresnel lens 4 is driven together with objective lens 5, since two beam spots respectively formed on recording layers 7 and 8 of optical disk 6 move in unison, there is a constant interval between the beam spots. The interval between recording layers 7 and 8, however, is varied due to variations in the thickness of the recording layers, caused by molding imperfections or deformation such as warpage.

Thus, in the above-described conventional optical pickup, the focal positions of beam spots formed on the multiple recording layers cannot be exactly adjusted, so that the optical pickup cannot be used for an optical disk having the multiple recording layers.

Also, according to the conventional optical pickup, since the two beam spots formed on the multiple recording layers of the optical disk originate from a single optical source, information cannot be independently recorded on two recording layers by an optical modulation method, so that the optical pickup can be applied only for reproduction and not for recording.

SUMMARY OF THE INVENTION

It is an object of the present invention to provide an optical pickup for an optical disk having multiple recording layers in which the focal points formed on the multiple recording layers can be separately adjusted.

It is another object of the present invention to provide an optical pickup for an optical disk having multiple recording layers on which and from which information can be recorded and reproduced.

To achieve the above object of the present invention, there is provided an optical pickup for an optical disk having multiple recording layers, comprising: an optical source for generating an optical beam; a diffraction optical element for diffracting the optical beam generated from the optical beam generator; an objective lens for focusing the beam diffracted by the diffraction optical element to form spots on each of the multiple recording layers; optical detecting means for detecting a predetermined electrical signal from the beam reflected from the optical disk; and driving means for independently driving the diffraction optical element and the objective lens by using the signals detected from the optical detecting means, to thereby exactly form focal points on each multiple recording layer.

Also, the optical pickup according to the present invention comprises a detector for dividing beam reflected from each of multiple recording layers and detecting each signal from the divided reflected beam, so as to detect a signal for driving the objective lens and the diffraction optical element.

To provide an optical pickup for an optical disk having multiple recording layers on or from each of which information is recorded or reproduced, there is provided an optical pickup for an optical disk having multiple recording layers, comprising: a plurality of optical sources for generating optical beams whose polarization directions are different from each other; a polarization diffraction optical element for polarization-diffracting the optical beam generated from the optical source; an objective lens for forming spots on each multiple recording layers by focusing the beam diffracted by the polarization diffraction optical element; a polarized beam splitter for polarization-dividing the beam reflected from the multiple recording layers according to the polarization direction; a plurality of optical detectors for detecting signals by receiving the reflected beam divided by the polarized beam splitter; and driving means for separately driving the polarization diffraction optical element and the objective lens by using the signals detected by a plurality of optical detectors.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
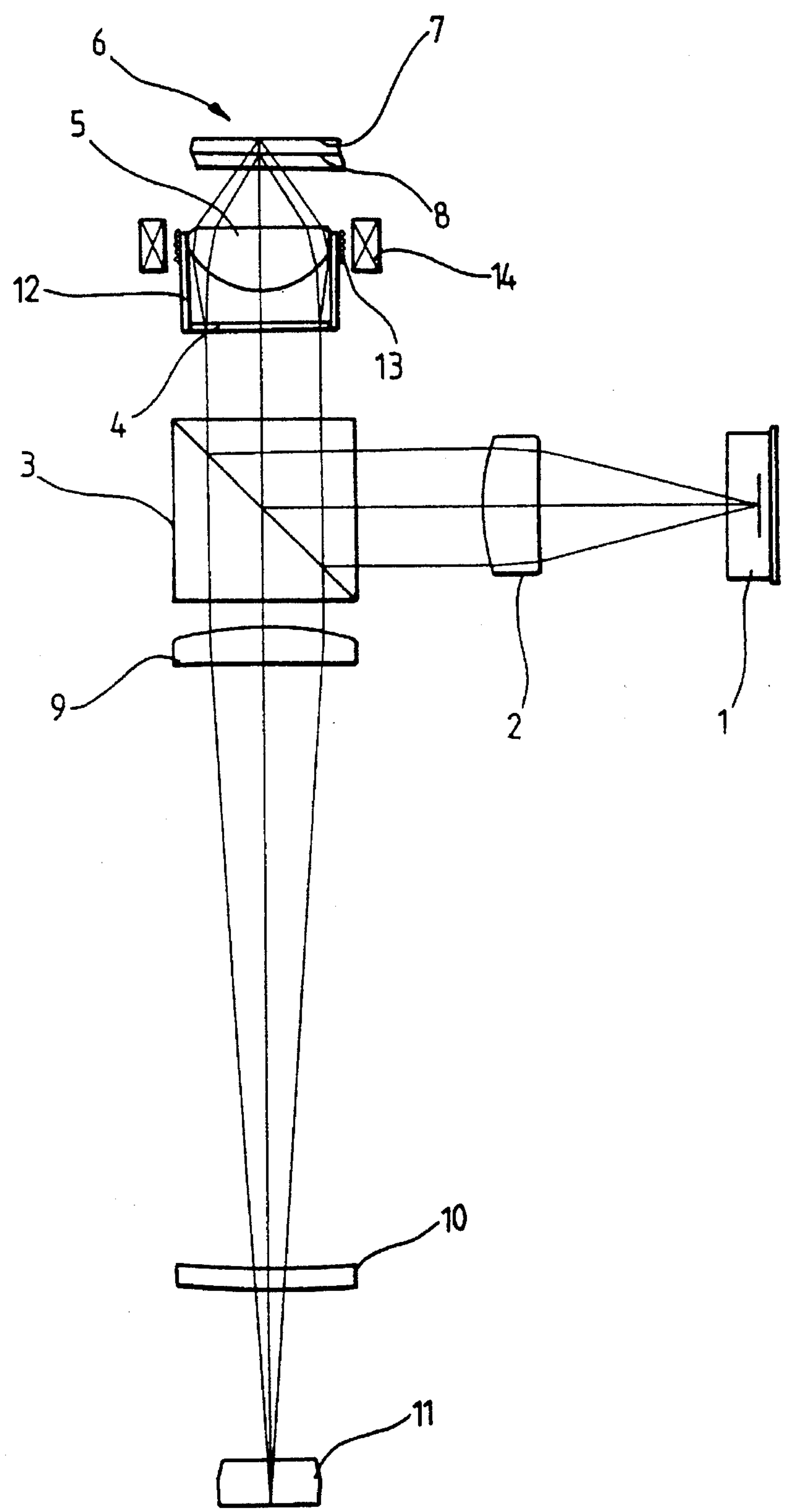
FIG. 1 is an arrangement plan showing an optical structure of a conventional optical pickup for an optical disk having dual recording layers.
Figure 2:
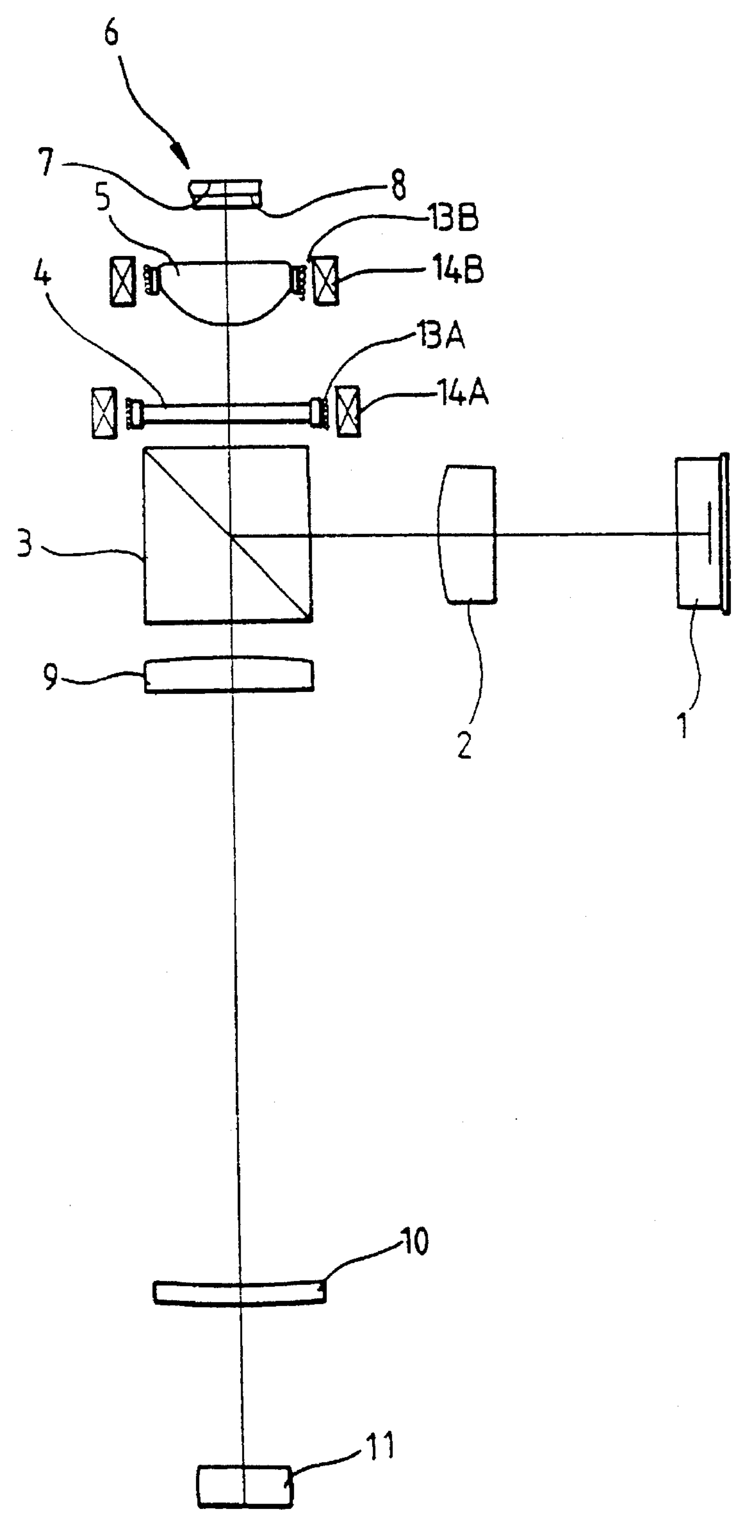
FIG. 2 is an arrangement plan showing an optical structure of an optical pickup for an optical disk having multiple recording layer according to a preferred embodiment of the present invention.

According to the preferred embodiment shown in FIG. 2, the optical arrangement is the same as that of the conventional optical pickup shown in FIG. 1. However, the optical pickup of FIG. 2 further comprises a driving portion for driving a Fresnel lens 4 and an objective lens 5 along the optical axis, which is constructed differently from the conventional optical pickup of FIG. 1. That is, Fresnel lens 4 and objective lens 5 are separated from each other and focus driving coils 13A and 13B are wound around Fresnel lens 4 and objective lens 5, respectively. Also, permanent magnets 14A and 14B for generating a magnetic flux field in focus driving coils 13A and 13B are arranged in parallel with focus driving coils 13A and 13B, respectively. Here, permanent magnets 14A and 14B may be a single permanent magnet which will be described later.

In FIG. 2, as described above, the optical beam generated from an optical source 1 is collimated by a collimating lens 2. The collimated optical beam is reflected by a beam splitter 3 and transmitted to a Fresnel lens 4 as a diffraction element. Then, the transmitted light is incident to an objective lens 5. Objective lens 5 focuses the beam diffracted by Fresnel lens 4. Two beam spots selected from diffracted beams focused by objective lens 5 are formed on recording layers 7 and 8 of optical disk 6, respectively.

The beams reflected from recording layers 7 and 8 of optical disk 6 pass through beam splitter 3 via objective lens 5 and Fresnel lens 4. The beam is detected as an electrical signal by optical detector 11 via a condensing lens 9 and a sensor lens 10. The signal detected by optical detector 11 is divided into signals corresponding to the data recorded on each of recording layers 7 and 8 and focus and track error information by a general circuit (not shown). Focus driving coil 13A for Fresnel lens 4 and focus driving coil 13B for objective lens 5 are excited according to the focus error signal, to thereby be moved together with the lens corresponding to each. Also, a track driving coil (not shown) may be installed corresponding to each of Fresnel lens 4 and objective lens 5, such that the lenses are driven by the above track error signal for a tracking control.

Figure 3:
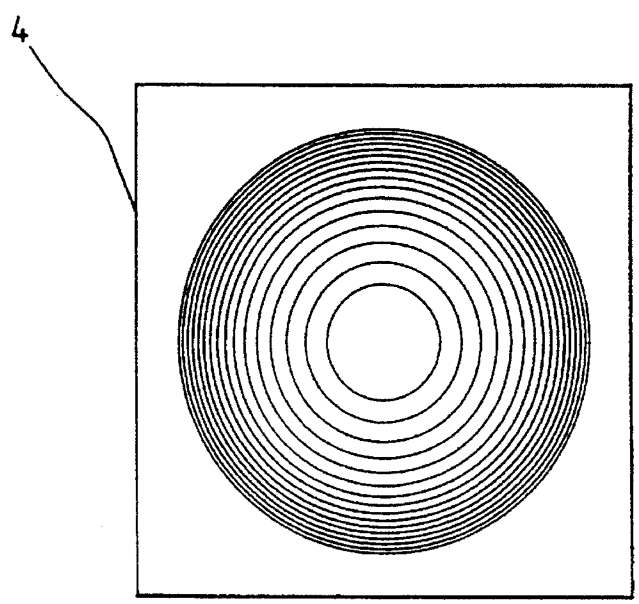
FIG. 3 is a plan view showing a diffraction optical element of the optical pickup for the optical disk having multiple recording layers according to a preferred embodiment of the present invention.
Figure 4:
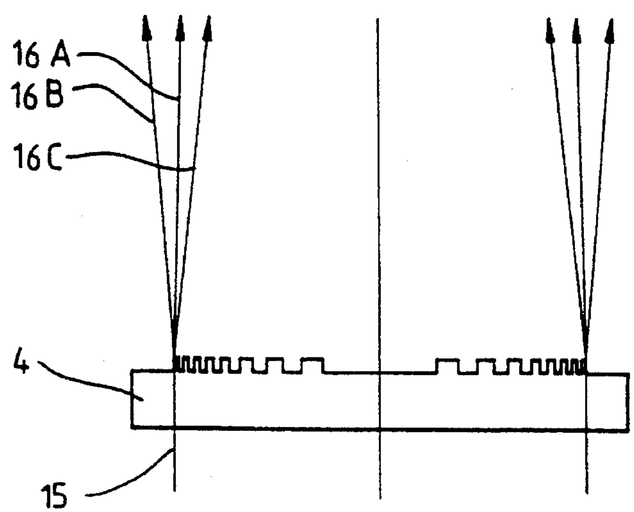
FIG. 4 ms a side view for illustrating the diffraction of the diffraction optical element shown in FIG. 3.

FIG. 3 shows a diffraction pattern of Fresnel lens 4. The diffraction pattern is composed of numerous concentric circles having a gradually widened spacing from the circumference down to an inner circle being a predetermined distance from the center. As shown in FIG. 4, the concentric circles have an alternately protruded and recessed cross-section. After collimated beam 15 is incident to Fresnel lens 4, the incident beam is diffracted into multiple beams, wherein the emitted beams include a zero-order beam 16A which is the incident beam passed through Fresnel lens without diffraction, i.e., transmittance, and symmetrical ± first-order beams 16B and 16C, which are diverged and converged at angles.

Figure 5:
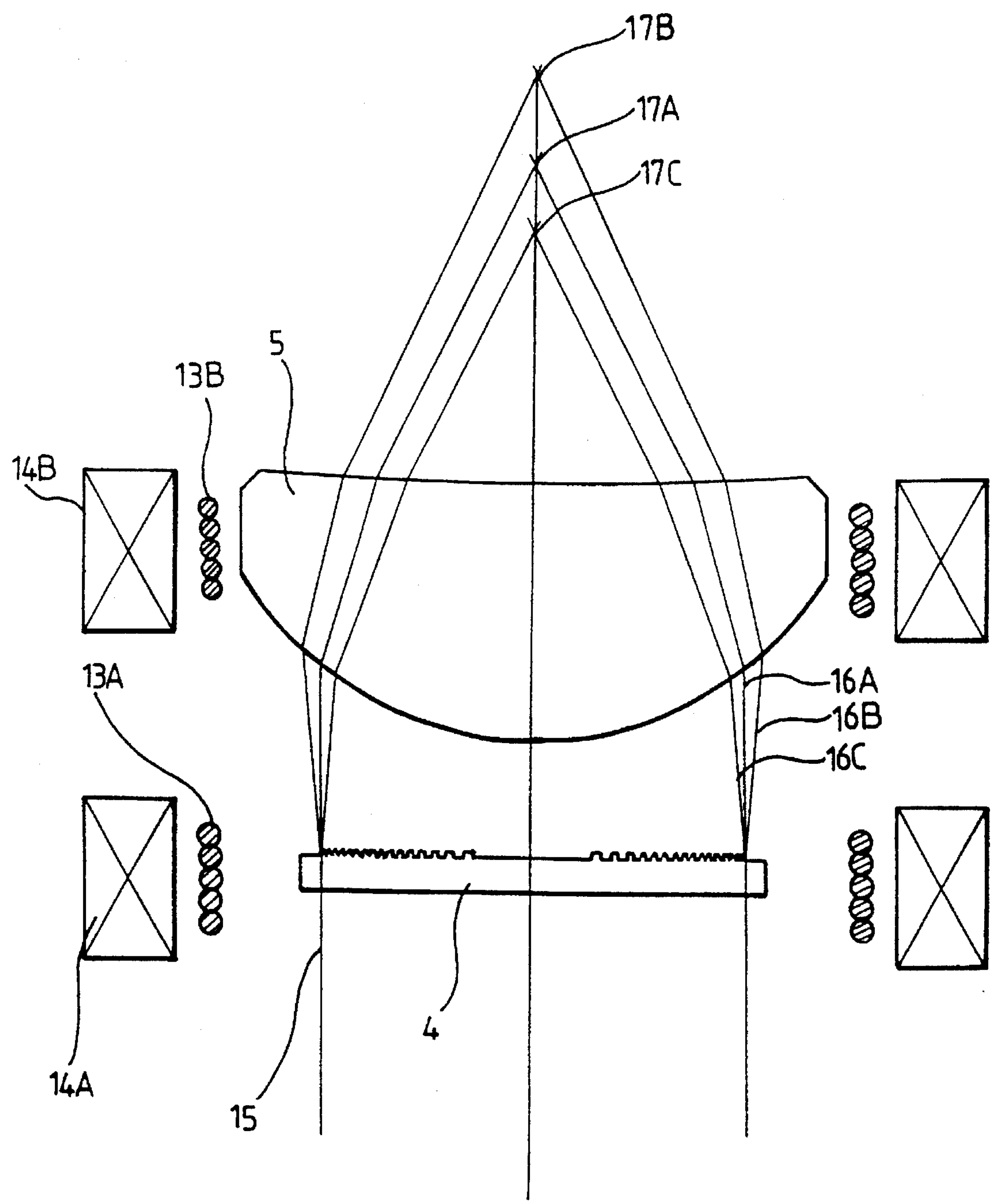
FIG. 5 is a side view for illustrating a process for forming focal points on the multiple recording layers of the optical disk using the optical pickup for optical disk having multiple recording layers according to a preferred embodiment of the present invention.

Referring to FIG. 5, beams 16A, 16B and 16C diffracted by Fresnel lens 4 form focal points 17A, 17B and 17C which are spaced on the same optical axis by objective lens 5. This plurality of focal points each of which may be formed on a recording layer of the optical disk by adjusting the diffraction rate of Fresnel lens 4 and the magnification power of objective lens 5. Here, since Fresnel lens 4 and objective lens 5 are separated from each other, the intervals among focal points 17A, 17B and 17C formed on the optical axis can be varied when the interval between Fresnel lens 4 and objective lens 5 is varied by driving Fresnel lens 4 and objective lens 5 using focus driving coils 13A and 13B and permanent magnets 14A and 14B. That is, the focal points can be exactly formed on each recording layer by properly driving each of focus driving coils 13A and 13B according to thickness of the optical disk shown in FIG. 2.

Figure 6:
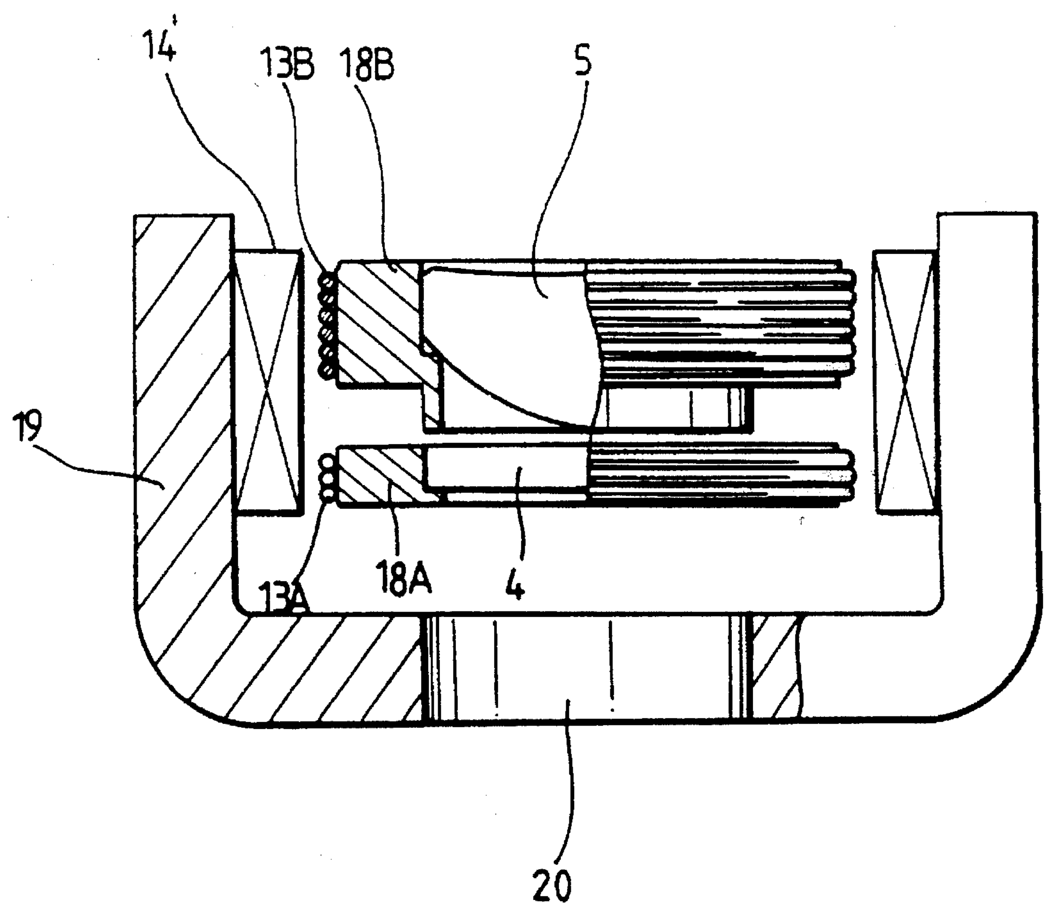
FIG. 6 is a cross-sectional view showing a driving portion applied to the optical pickup for optical disk having multiple recording layers according to a preferred embodiment of the present invention.

FIG. 6 schematically shows the structure of the above-described driving portion according to a preferred embodiment of the present invention. Fresnel lens 4 and objective lens 5 are floated together with holders 18A and 18B for holding each lens while being separated from each other. Focus driving coils 13A and 13B are wound around holders 18A and 18B and a pair of permanent magnets 14' shared by focus driving coils 13A and 13B are arranged opposing each other. Permanent magnets 14' are supported by a yoke 19 on the inner sides of which the magnets are attached. A hole 20 in the center of yoke 19 is provided as a path through which the incident beam passes.

Figure 7:
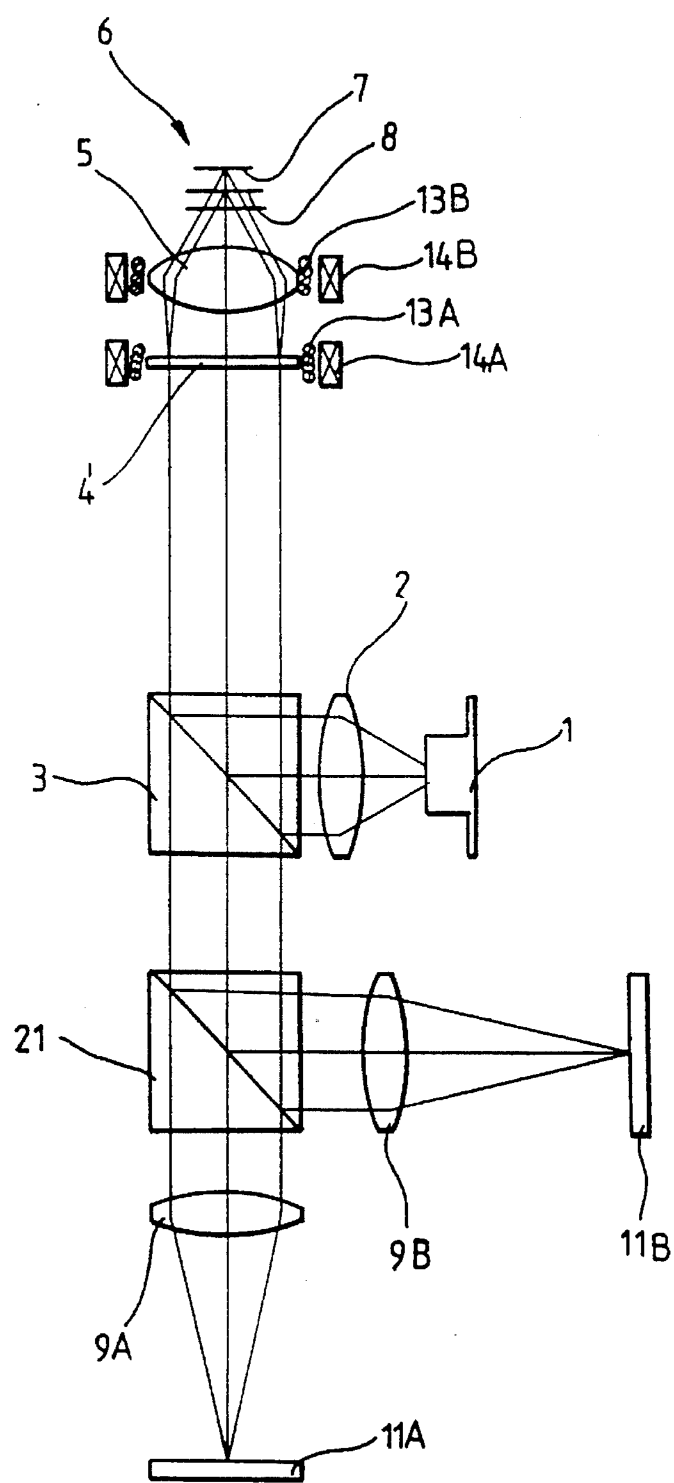
FIG. 7 is an arrangement plan showing an optical structure of an optical pickup for an optical disk having multiple recording layers according to another preferred embodiment of the present invention.

FIG. 7 shows an optical pickup according to another preferred embodiment of the present invention. According to this preferred embodiment, the optical pickup comprises a polarization Fresnel lens 4', a polarization beam splitter 21 for polarization-dividing the beams reflected from multiple recording layers 7 and 8 of optical disk 6, two condensing lenses 9A and 9B for detecting signals from each of two divided reflected beams and two optical detectors 11A and 11B.

The beams of zero- and first-order 16A and 16B whose polarization directions are perpendicular with respect to each other are diffracted by polarization Fresnel lens 4'. Also, the polarizations of the beams reflected from each of recording layers 7 and 8 of optical disk 6 are perpendicular with respect to each other. The reflected beams are divided into two beams by polarization beam splitter 21: one being reflected from recording layer 7 and the other being reflected from recording layer 8. The two signals detected, without mutual interference, by optical detectors 11A and 11B include such information as the recorded data and focal positions. Thus, these two signals via a circuit means (not shown) separately drive focus driving coil 13A of polarization Fresnel lens 4' and focus driving coil 13B of objective lens 5, to thereby exactly control the focal positions on each recording layers 7 and 8 according to the thickness of optical disk 6.

Figure 8:
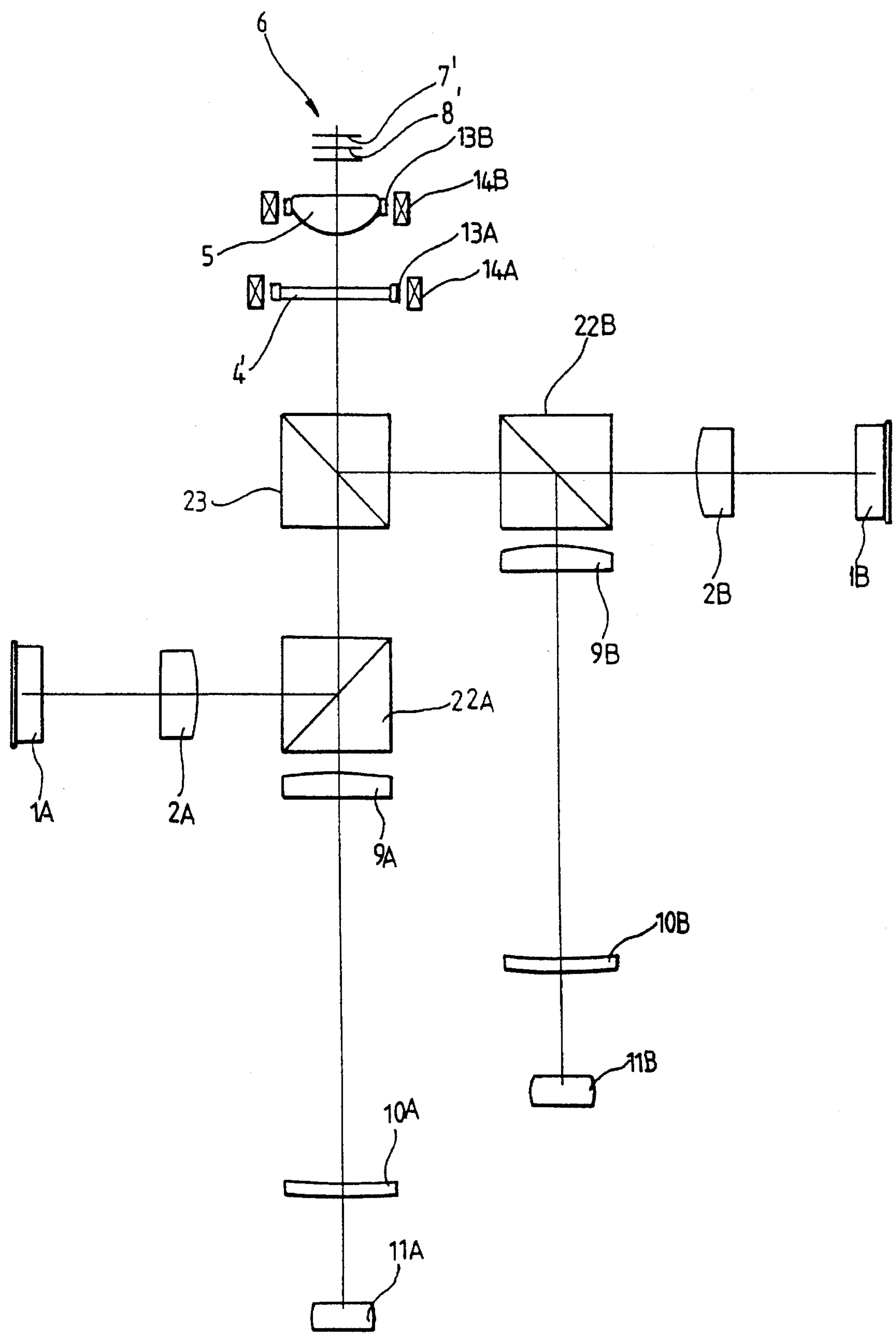
FIG. 8 an arrangement plan showing an optical structure of an optical pickup for an optical disk having multiple recording layers according to still another preferred embodiment of the present invention.

Next, FIG. 8 shows an optical pickup according to still another preferred embodiment of the present invention. This optical pickup is for both recording and reproducing such that information can be recorded on each of recording layers 7 and 8 and can be read out therefrom as well, by applying the optical pickup shown in FIG. 7.

According to this preferred embodiment, an optical disk 6' having magneto-optical recording layers 7' and 8' is preferably used. A first optical source 1A generates P-polarized light. After the P-polarized light is collimated by a collimating lens 2A, the collimated beam is reflected by a beam splitter 22A and passes through polarized beam splitter 23. Then, the beam is focused on a first recording layer 7' of optical disk 6' as a spot, via a polarization Fresnel lens 4' and an objective lens 5. The beam reflected from first recording layer 7' passes through polarized beam splitter 23 and beam splitter 22A via objective lens 5 and polarization Fresnel lens 4' in sequence. Then, the beam passed through beam splitter 22A is detected as an electrical signal by first optical detector 11A via condensing lens 9A and sensor lens 10A. On the other hand, a second optical source 1B generates S-polarized light. After the S-polarized light is collimated by a collimating lens 2B, the collimated lens passes through beam splitter 22B and is reflected by polarized beam splitter 23. Then, the reflected light is focused as a spot on a second recording layer 8' of optical disk 6' via Fresnel lens 4' and objective lens 5. The beam reflected from second recording layer 8' passes through objective lens 5 and polarization Fresnel lens 4' in sequence. Then, the beam having passed through polarization Fresnel lens 4' is reflected by polarized beam Splitter 23 and beam splitter 22B in sequence and detected as an electrical signal by a second optical detector lib via condensing lens 9B and sensor lens 10B. Focus driving coil 13A of polarization Fresnel lens 4' and focus driving coil 13B of objective lens 5 are driven by the signals of first and second optical detectors 11A and 11B, as described above.

According to this optical pickup, since the optical disk uses different optical sources according to the recording layers, information can be separately recorded on each of recording layers. Also, the data recorded on each of recording layers can be read out by separately or simultaneously scanning each recording layer during reproduction. Especially, in recording and reading out information, since polarized light of opposite polarizations are used, information can be recorded and read out without interference, to thereby record and reproduce information without noise.

As described above, in the construction of the optical pickup for an optical disk having multiple recording layers according to the present invention, there is provided an optical pickup having a driving portion for varying the interval between the diffraction optical element (Fresnel lens or polarization Fresnel lens) and the objective lens, wherein the diffraction optical element and the objective lens are spaced from each other, to thereby simultaneously scan each recording layer while forming focal points on each recording layer according to the thickness of the optical disk. As a result, when information of each recording layer is reproduced, the reproducing operation is stably performed without error and information is clearly reproduced without noise.

Also, in the optical pickup according to the present invention, an optical system is independently constructed in each recording layer of an optical disk, together with the driving portion, so that information can be independently recorded on and read out from each recording layer. Therefore, there is provided an optical pickup for recording as well as reproducing.

What is claimed is:

1. An optical pickup for an optical disk having multiple recording layers, comprising:

an optical beam generator for generating an optical beam;

a diffraction optical element for diffracting the optical beam generated by said optical beam generator;

an objective lens for focusing the beam diffracted by said diffraction optical element to form spots on each of said multiple recording layers;

optical detecting means for detecting a predetermined electrical signal from the beam reflected from the optical disk; and driving means for independently driving said diffraction optical element and said objective lens by using the signals detected from said optical detecting means, to thereby exactly form focal points on each of the multiple recording layers.

2. An optical pickup for an optical disk having multiple recording layers as claimed in claim 1, wherein said driving means comprises focus driving coils connected to each of the diffraction optical element and objective lens, and one or more permanent magnets for generating magnetic flux from said focus driving coils.

3. An optical pickup for an optical disk having multiple recording layers as claimed in claim 1, wherein said diffraction optical element includes means for polarization-diffracting the incident beam to focus beams having different polarization directions on said multiple recording layers, and said optical detecting means includes a polarized beam splitter for polarization-dividing the beam reflected from said multiple recording layers and a plurality of optical detectors for respectively receiving the reflected beams divided by said polarized beam splitter.

4. An optical pickup for an optical disk having multiple recording layers as claimed in claim 1, wherein said diffraction optical element includes means for polarization-diffracting the incident beam to focus beams having different polarization directions on said multiple recording layers, said optical beam generator includes a plurality of optical sources for generating polarized lights whose polarization directions are different from each other, said optical detecting means includes a plurality of optical detectors for receiving the beam reflected from each recording layer of the optical disk and a polarized beam splitter for dividing an optical pathway of polarized light generated by the plurality of optical sources is further comprised, to thereby separately record or read out information on or from each recording layer of the optical disk.

5. An optical pickup for an optical disk having multiple recording layers, comprising:

an optical source for generating an optical beam;

a polarization diffraction optical element for polarization-diffracting the optical beam generated from said optical source;

an objective lens for forming spots on each multiple recording layer by focusing the beam diffracted by said polarization diffraction optical element;

a polarized beam splitter for polarization-dividing beams reflected from said multiple recording layers;

a plurality of optical detectors for detecting signals by receiving the reflected beams divided by said polarized beam splitter; and driving means for separately driving said polarization diffraction optical element and said objective lens by using the signals detected by said plurality of optical detectors.

6. An optical pickup for an optical disk having multiple recording layers, comprising:

first and second optical sources for generating P-polarized light and S-polarized light, respectively;

a polarized beam splitter for passing one of said P- and S-polarized light and reflecting the other;

a polarization diffraction optical element for polarization-diffracting the polarized light from said polarized beam splitter;

an objective lens for forming spots on each multiple recording layer of said optical disk by focusing the polarized light diffracted by said polarization diffraction optical element;

first and second optical detectors for detecting signals by receiving the light output from said polarized beam splitter after being reflected from said multiple recording layers of the optical disk; and driving means for separately driving said polarization diffraction optical element and said objective lens by using the signals detected by said first and second optical detectors.

* * * * *